3,338,214
MOVABLE EGG STOP FOR LAYING CAGES
William W. Pockman, Decatur, Ala., assignor to Montgomery & Crawford, Inc., a corporation of Delaware
Filed May 16, 1966, Ser. No. 550,283
1 Claim. (Cl. 119—48)

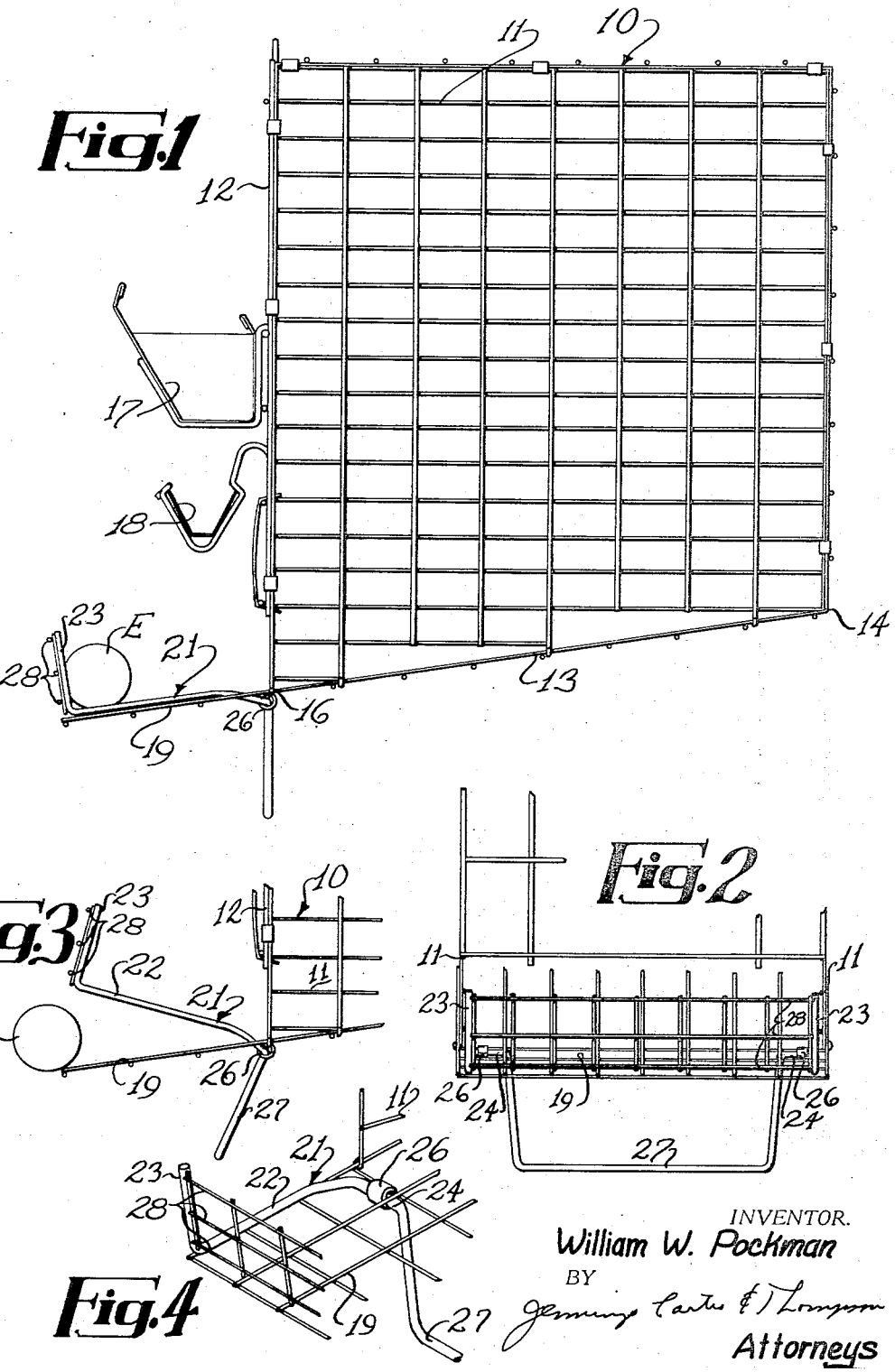

ABSTRACT OF THE DISCLOSURE

Means for discharging eggs from laying cages which embodies a shelf portion extending outwardly beyond the confines of the cage and onto which the eggs roll as they are laid by the fowls, in combination with a stop at the outer edge of the shelf in the form of a wire member, the stop being gravity actuated to egg holding position and the stop being pivoted at a point generally in the vertical plane of the front wall of the cage, the apparatus being provided with a depending operator so that when the operator is moved outwardly and upwardly the egg stop moves correspondingly, thereby permitting the egg to roll off the end of the shelf into a suitable collector.

---

This invention relates to laying cages and especially to an improved means for discharging the eggs from the shelf or ledge of the cage on which they collect.

In this art laying hens are confined in cages, generally formed of wire mesh material, which cages also generally have sloping bottoms. Such sloping bottoms permit the eggs, when layed, to roll downwardly, outside of the cage and out of reach of the hens where they may be collected. In the actual operation of an egg farm in which cages are used, a major proportion of the total labor involved is in collecting the eggs. In practice the operator must go down the rows of cages and manually pick up the eggs and place them in a collecting container such as a basket.

In attempting further to automate the laying cage type egg production unit, it has been proposed to have certain collecting mechanisms move down between the rows of cages and automatically to remove the eggs from the shelves. However, so far as I am aware no one has yet proposed a satisfactory means for actually permitting the eggs to roll into such collecting mechanisms.

In view of the foregoing an object of my invention is to provide an improved means for permitting the eggs to roll off the lower edge of the collecting shelf, either in response to the passage of a mechanical collecting means down the rows between the cages or, by semi-automatic means in which the operator places a container beneath the lower edge of the shelves and then raises the stop.

A further and more detailed object is to provide a vertically movable stop placed at the lower edge of the shelf and which is pivoted generally in the plane of the front wall of the cage. The purpose here is to prevent undue complications, structurally, and further to prevent increasing the overall dimensions of the cage.

A still further object is to provide a stop of the character designated which is provided with an operator lying below the level of the bottom of the cage, which, when moved either manually or upon being engaged by a part of the moving mechanical egg collector, raises the stop upwardly, releasing the eggs for rolling off the edge of the shelf.

A laying cage provided with my improved stop is illustrated in the accompanying drawing forming part of this application in which:

FIG. 1 is a side elevational view of a laying cage equipped with my improved stop;

FIG. 2 is a fragmental front elevational view of the lower portion of the cage showing the stop in place, ready to receive the eggs;

FIG. 3 is a detail fragmental view showing the stop in raised position illustrating an egg about to roll off the lower edge of the shelf; and, FIG. 4 is a detail fragmental perspective view illustrating a portion of the stop and the shelf.

Referring now to the drawings for a better understanding of my invention I show in FIG. 1 a laying cage illustrated as being of the wire mesh type and indicated by the numeral 10. As shown, the cage embodies the side walls 11 and a front wall 12. The cage is further provided with a wire mesh bottom 13 which slopes from the rear of the cage at 14 to the front at 16. The cage is provided with the usual feed trough 17, and water trough 18.

The egg collecting shelf 19 may be provided separately, but preferably is an extension of the bottom 13 and lies in the same plane therewith. The egg shelf may be made of wire mesh material and preferably is of the type in which the top wires are parallel to the rolling motion of the egg as clearly shown in the drawings.

My improved egg stop is indicated generally by the numeral 21. Thus, my improved stop 21 may comprise a single length of relatively heavy wire bent to provide a pair of side arms 22 and upturned, generally vertical sections 23 on the ends thereof. The stop 21 further comprises a pair of sections 24 which pass through clip type bearings 26 mounted preferably in the plane of the front wall 12. Still further, the wire forming the stop may be provided with a downwardly extending operator section 27. The stop is completed by the provision of a plurality of cross wires 28 joining the generally vertical leg portions 23, against which the eggs rest thus to prevent them from rolling off the lower edge of the shelf 19.

From the foregoing it is now possible to explain more in detail the construction and advantages of my improved stop. First, it will be understood that the front wall, at the juncture of the lower edge 16 with the bottom is cut away so that eggs laid by the hens are free to roll outwardly, onto the shelf as illustrated in FIG. 1, one egg being indicated by the letter E. Normally, the stop occupies the position shown in FIGS. 1, 2 and 4 that is, with the arms 22 lying on top of the shelf 19, in positon for the wires 28 to prevent the eggs from falling off the lower end of the self. In this position the eggs as laid roll against the wires 28 and rest there, out of reach of the hens, which are known, oftentimes, to destroy the eggs once they have laid them. When it is desired to gather the eggs the operator places a receptacle immediately under the edge of the shelf and operates the handle 27, whereby the stop raises to the position of FIG. 3, permitting the eggs to roll into the receptacle. However, if mechanical means are used to gather the eggs this is done by bringing the mechanism down the rows of the cages, it being understood that the cages are arranged in rows, face to face. By certain means on the gathering mechanisms, not shown, the stops automatically are raised to the position shown in FIG. 3 as the gathering mechanism passes the cages, letting the eggs roll into the collector.

It is to be noted that the pivot points typified by the bearings 26, as stated, are located generally in the plane of the wall 12. In this position the stop may be raised by means of the lower operator 27 without having to increase the overall width or other dimensions of the cage.

From the foregoing it will be apparent that I have devised an improved laying cage with a movable egg stop. By the use of my invention I have been able to reduce materially the labor required to gather eggs which are produced in laying cages. Further, my invention lends itself readily to mass production methods of fabrication, and is simple and durable.

While I have shown my invention in but one form it will be obvious to those skilled in the art that it is not so limited, but is susceptible of various changes and modifications without departing from the spirit thereof, and I desire, therefore, that only such limitations shall be placed thereupon as are specifically set forth in the appended claim.

What I claim is:

In a laying cage of the type having a front wall, a sloping bottom, and a shelf extending outwardly of the wall and outside the cage and substantially coplanar with the bottom and onto which the eggs from the cage roll by gravity, (a) a stop adjacent the lower edge of the shelf against which the eggs come to rest as they roll to the lower edge of the shelf, (b) pivoting means securing the stop to the bottom for upward movement in which position the eggs roll off the lower edge of the shelf, (c) said stop being gravity biased toward its lower, egg holding position, (d) an operator means for the stop located beneath the cage and extending below the pivot means for the stop, (e) said stop comprising an integral length of wire having a pair of legs lying on top of the shelf when the stop is in lowered position, another pair of legs at the outer ends of the first legs arranged substantially vertically, cross members connecting said vertical legs thereby to hold the eggs against rolling off the shelf, a cross portion of the wire joining the rearward ends of the first named legs with said operator means, and (f) said pivoting means including bearings located generally in the plane of the front wall in which the cross portion of the stop is journaled.

References Cited

UNITED STATES PATENTS 3,109,413    11/1963    Patchett _____ 119—48
3,145,793    8/1964    Ray _____ 119—48 X SAMUEL KOREN, *Primary Examiner.*

HUGH R. CHAMBLEE, *Examiner.*